US007248658B2

(12) United States Patent
Zalio

(10) Patent No.: US 7,248,658 B2
(45) Date of Patent: Jul. 24, 2007

(54) METHOD AND CIRCUIT FOR DERIVING A SECOND CLOCK SIGNAL FROM A FIRST CLOCK SIGNAL

(75) Inventor: Filip Zalio, Victoria (AU)

(73) Assignee: NEC Corporation, Tokyo (JP)

( * ) Notice: Subject to any disclaimer, the term of this patent is extended or adjusted under 35 U.S.C. 154(b) by 783 days.

(21) Appl. No.: 09/968,524

(22) Filed: Oct. 2, 2001

(65) Prior Publication Data
US 2002/0039396 A1   Apr. 4, 2002

(30) Foreign Application Priority Data
Oct. 2, 2000   (AU) .............................. PR0485/00

(51) Int. Cl.
*H04L 7/00* (2006.01)
(52) U.S. Cl. .................................................. 375/355
(58) Field of Classification Search ............... 375/355, 375/354, 377, 395.62, 395.61, 395.6, 395.1, 375/389, 351
See application file for complete search history.

(56) References Cited

U.S. PATENT DOCUMENTS

| | | | | |
|---|---|---|---|---|
| 5,554,987 A | * | 9/1996 | Ooga | 341/147 |
| 5,767,915 A | * | 6/1998 | Hulvey | 348/509 |
| 5,789,950 A | * | 8/1998 | Nakagawa | 327/105 |
| 6,118,758 A | * | 9/2000 | Marchok et al. | 370/210 |
| 6,243,372 B1 | * | 6/2001 | Petch et al. | 370/350 |
| 6,281,823 B1 | * | 8/2001 | Gross et al. | 341/144 |
| 6,885,716 B1 | * | 4/2005 | Zalud et al. | 375/361 |

OTHER PUBLICATIONS

Hickman, Direct Digital Synthesis, Electronics World and Wireless World, Sep. 1992, pp. 746-748.*
"Direct Digital Synthesis", Electronics World + Wireless World, (Sep. 1992), pp. 746-748.
Hickman I: "Direct Digital Synthesis", Electronics World and Wireless World, Reed Business Publishing, vol. 97, No. 1678, (Sep. 1, 1992), pp. 746-748.

* cited by examiner

*Primary Examiner*—Pankaj Kumar
(74) *Attorney, Agent, or Firm*—Sughrue Mion, PLLC

(57) ABSTRACT

A clock generation circuit for a dual system radio frequency station is provided. The station includes a digital synthesis circuit clocked by a first clock signal for a first RF system that is adapted to generate a base signal output of a predetermined frequency. A second clock signal is derived from the sum of the frequency of the base signal and the frequency of the first clock signal.

6 Claims, 8 Drawing Sheets

METHOD AND CIRCUIT FOR DERIVING A SECOND CLOCK SIGNAL FROM A FIRST CLOCK SIGNAL

BACKGROUND OF THE INVENTION

1. Field of the Invention

The present invention relates to radio frequency communications, and in particular to a method and circuit for generating a variable frequency clock signal from a crystal oscillator, and for adjusting the frequency of the variable clock signal to compensate for carrier frequency and sampling rate errors.

2. Description of the Prior Art

Mobile telephones have become a normal part of everyday life. However, there are competing standards for mobile telephone networks around the world. Today, two important digital mobile network systems are the Global System for Mobile communications (GSM) and Wideband Code Division Multiple Access (WCDMA). These two systems use different techniques for channel allocation on the broadcast network, and they use different carrier frequencies. In communications systems, carrier frequencies are derived from a reference timing signal clock which is generated by a crystal oscillator. The same oscillator is also used as a reference clock for the analog-to-digital converter (ADC) and the digital-to-analog converter (DAC) which interface the analog and digital circuits in the system. However, because the crystal oscillator has limited precision, the carrier frequency and the ADC sampling rate may deviate from their nominal values. In some communications systems (e.g., CDMA), it is necessary to compensate for these deviations in order for the system to function properly.

In a dual system supporting both GSM and WCDMA communications, two clock frequencies are required to drive the receiving and transmitting electronics in mobile telephones: a 13 MHz clock for the GSM subsystem, and a 15.36 MHz clock for the WCDMA subsystem. A WCDMA subsystem also compensates for the carrier and sampling frequency offsets described above.

It is not always practical to provide two crystal oscillators to generate dual clock frequencies in a mobile telephone. Existing systems use a single, voltage-controlled, temperature-compensated crystal oscillator for the first clock, and derive the second clock from a second voltage-controlled oscillator driven by a phase-locked loop (PLL) using the first clock as a reference clock. The second frequency may be tuned by fine adjustments of the control voltage of the voltage-controlled oscillator. However, the tuning speed is limited by the settling times of the PLL and voltage adjustment circuits. When the greatest common divisor of the two clock frequencies is low (e.g., 40 kHz for 13 MHz and 15.36 MHz), the PLL settling time is long, and the system performance is degraded. Furthermore, the high resolution required in the control voltage circuit increases the system cost. It is desired, therefore, to provide a system for accurately and rapidly generating a second clock frequency from a first clock frequency, or at least provide a useful alternative.

SUMMARY OF THE INVENTION

The present invention provides a clock generation circuit for a dual system radio frequency (RF) station, including:

a digital synthesis circuit clocked by a first clock signal for one RF system and adapted to generate an output having a base signal of a predetermined frequency; and filter means for deriving a second clock signal for another RF system from a signal of said output, said signal having a frequency corresponding to the frequency of said second clock signal.

Advantageously said signal is an artefact of said output. Preferably said signal is a Nyquist image of said output.

The present invention also provides a clock generation circuit for a dual system radio frequency (RF) station, including:

a digital synthesis circuit clocked by a first clock signal for one RF system and adapted to generate an output having a base signal of a predetermined frequency;

a filter for filtering a Nyquist image of said output, said Nyquist image having a frequency being the sum of the frequency of the first clock signal and the predetermined frequency, and being the frequency of a second clock signal for another RF system.

The present invention also provides a method for deriving a second clock signal from a first clock signal, where the frequency of said second clock signal is greater than half the frequency of said first clock signal, including the steps of:

clocking a direct digital synthesis circuit with said first clock signal;

applying a phase step in said synthesis circuit such that a signal generated by said circuit has the frequency of said second clock signal; and filtering the output of said synthesis circuit to select said signal.

Advantageously, the frequency of said second clock signal may be greater than the frequency of said first clock signal.

Advantageously, the frequencies of said clock signals may be those used by different radio frequency communications systems.

Advantageously, said phase step may be such that a base signal frequency generated by said circuit represents the difference in frequency between said first clock signal and said second clock signal.

Preferred embodiments of the present invention are hereinafter described, by way of example only, with reference to the accompanying drawings, wherein:

DESCRIPTION OF THE EXEMPLARY EMBODIMENTS

Figure 1:
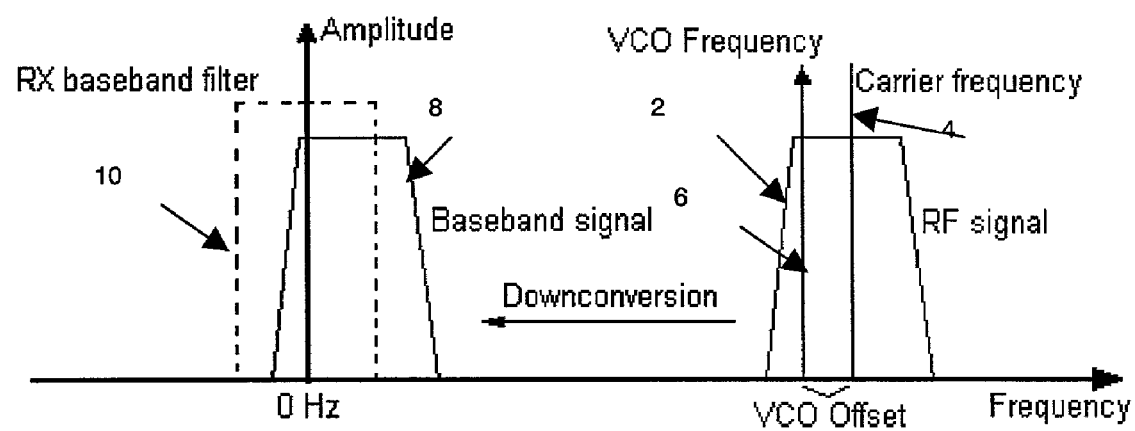
FIG. 1 is a schematic frequency spectrum diagram showing carrier frequency downconversion in a communications system of the prior art.

In a WCDMA receiver, the radio-frequency (RF) channel frequency 4 is determined by mixing the incoming RF signal 2 with a signal 6 generated by a voltage controlled oscillator (VCO) driven by a phase-locked loop (PLL), as shown in FIG. 1. The downconversion process can be performed in one or more stages, depending on the actual architecture of the RF subsystem. The RF PLL determines the RF channel frequency in frequency steps which are equal to the RF channel separation (200 kHz). Any fine adjustments to this frequency (frequency offset compensation) are realised by additional circuitry. The PLL effectively works as a multiplier of the reference frequency, therefore, a relative error in the reference frequency is transformed to the same relative error in the RF frequency. For example, an error of 10 ppm in the reference frequency translates to a 20 kHz offset for a 2 GHz carrier frequency. As illustrated in FIG. 1, any such offset between the true carrier frequency 4 and the actual VCO frequency 6 causes the centre frequency of the downconverted baseband signal 8 to be offset from 0 Hz. Due to this offset, part of the downconverted signal may be suppressed by a baseband filter 10 applied prior to demodulation. Indeed, demodulation and decoding of such a shifted signal may be degraded or even impossible, depending on the magnitude of the offset. In the phase domain, the baseband signal constellation will rotate with a speed equal to the frequency offset. Because of this rotation, the value of the correlation peak (e.g., used for cell searching) depends on the frequency offset. A frequency offset of about 10 ppm or more will render the signal undetectable.

After the value of the frequency offset has been determined, the receiver carrier frequency must be adjusted in very fine steps (0.1 ppm or better) to compensate for the offset. The time available for a cell search is limited, and it is preferable to adjust the carrier frequency as quickly as possible.

In the transmitter, the carrier frequency of the transmitted signal has to be within ±0.1 ppm of the received carrier frequency as seen by a mobile station. Thus the transmitted carrier frequency must be adjustable by the same fine steps used in the receiver. The value of the transmitted frequency offset compensation will be equal to the value determined for the receiver.

In WCDMA systems, each station is assigned a unique pseudo-random sequence of +1 and −1 values, referred to as the spreading code. Each bit of the digitised input data (for example, digitised voice) is divided into a number of intervals referred to as chips, and the stream of chips is multiplied by the repeating spreading code. In a WCDMA receiver, the incoming data stream is derived by digitising the baseband signal at the ADC sampling frequency. The ADC can, for example, run at four times the WCDMA chip frequency. However, a frequency offset in the ADC sampling rate causes an offset in the WCDMA slot/frame boundaries, degrading the decoding performance. For example, a sampling rate offset of +10 ppm causes the receiver to slip by one chip (and lose synchronisation) after 2 WCDMA frames. Because they are derived from the same clock, the relative frequency offset of the sampling rate is the same as the relative carrier frequency offset. This means that the relative compensation value determined for the carrier frequency can be also used to correct the receive and transmit sampling rate.

Figure 2:
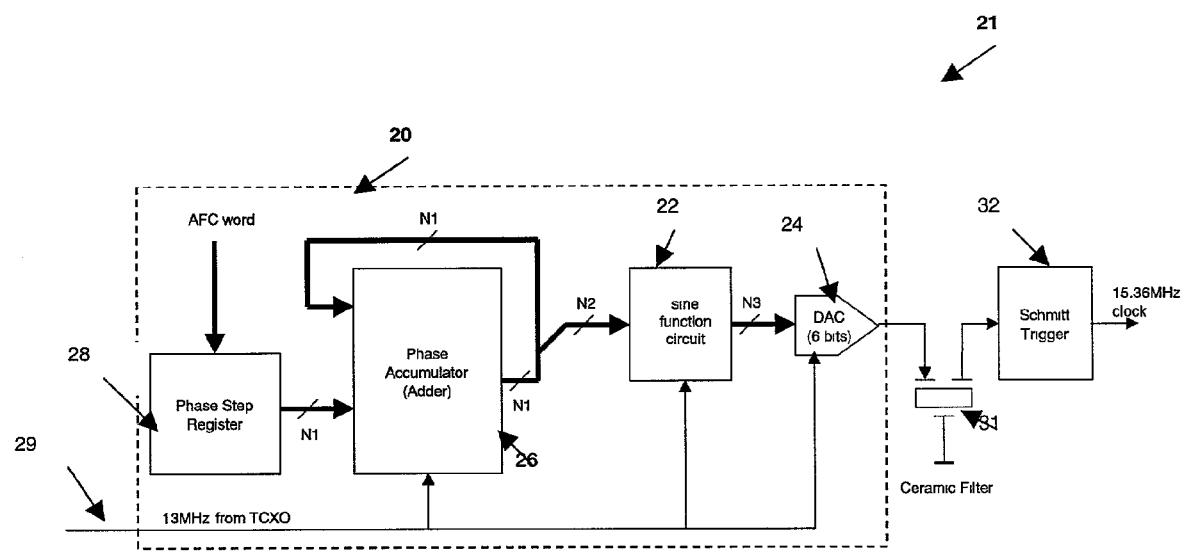
FIG. 2 is a block diagram of a preferred embodiment of a clock generation circuit.

A clock generation circuit 21, as shown in FIG. 2, uses a Direct Digital Synthesis (DDS) circuit 20 to generate and tune a second clock signal from a first clock signal in a dual mobile telephone system. The DDS circuit 20 has a higher tuning resolution, faster tuning speed and lower phase noise than a PLL circuit. DDS is a technique whereby analog signals are digitally synthesised. For clock signal generation, the aim is to generate an analog sine wave at the desired clock frequency. This is achieved by converting stored or calculated values of a mathematical sine function from a sine function circuit 22 into an analog signal by a built-in digital-in-analog converter (DAC) 24. The operand of the sine function (i.e., the x in sin(x)) is supplied by a phase accumulator circuit 26 which simply adds the value stored in a phase step register 28 each time the circuit 26 is triggered by a DDS clock signal 29. The frequency of the output signal depends upon the value stored in the phase step register 28, and how often the entire DDS circuit 20 is triggered by the DDS clock signal 29.

An important point of DDS is that the analog output signal generated by the digital circuit 20 suffers from artefacts of the generation process. These arise from the step-wise nature of the DAC output, and the fact that the analog output signal can only change as rapidly as the frequency of the DDS clock signal 29. Thus, in normal applications, the frequency of the DDS clock signal 29 is at least a factor of two greater than the highest frequency signal to be generated, and the DDS analog output signal is passed through a low-pass filter to remove the spurious high frequency artefacts. However, the clock generation circuit 21 exploits these 'artefacts' to produce a WCDMA clock frequency of 15.36 MHz from an input clock frequency of 13 MHz.

Figure 3:
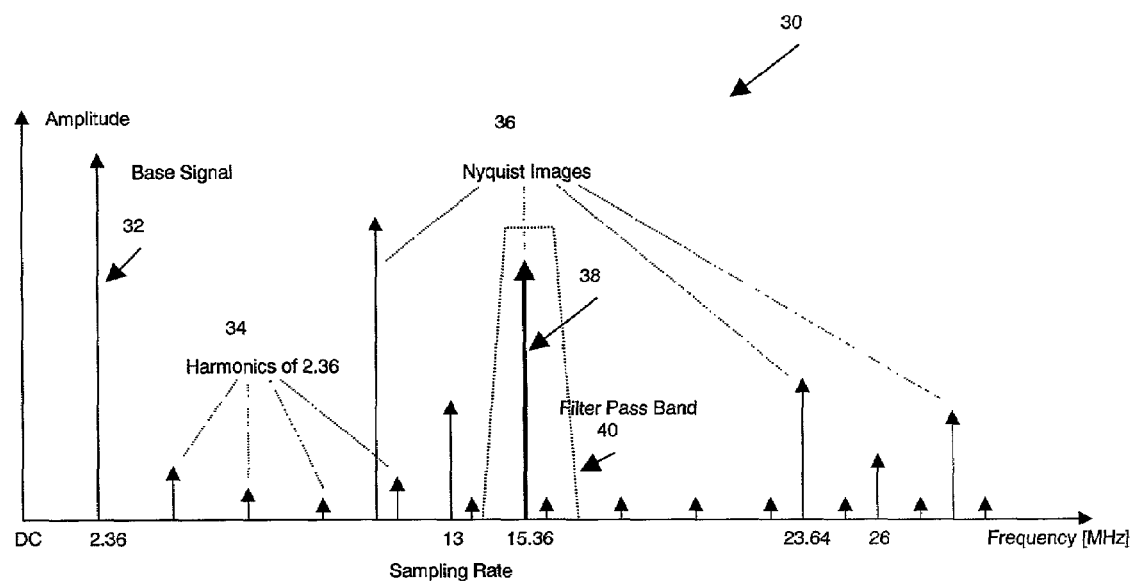
FIG. 3 is a schematic frequency spectrum showing clock generation in the clock generation circuit.

FIG. 3 is a schematic illustration of the frequency spectrum output 30 from the DAC 24 of the DDS circuit 20. The spectrum is for a DDS clock signal 29 of 13 MHz and a phase step register value which together generate a nominal DDS output frequency of 2.36 MHz. In addition to the normal base signal 32 at 2.36 MHz, the frequency spectrum 30 contains a number of digital artefacts, including harmonics 34 of the 2.36 MHz fundamental and Nyquist images 36 arising from combinations of the fundamental and the DDS clock signal 29. As described above, these harmonics 34 and Nyquist images 36 are normally undesirable and represent forms of distortion of the synthesised base signal 32 at 2.36 MHz. However, in this circuit 21, the Nyquist image 38 representing the frequency sum of the 13 MHz DDS clock signal 29 and the 2.36 MHz fundamental is used to derive a 15.36 MHz clock signal. A narrow band pass filter 40 around the Nyquist image 38 in the frequency spectrum is required, and in the circuit of FIG. 2, this is realised by a ceramic filter 31. The low-level sine wave output is then passed through a Schmitt Trigger 32 in order to generate a 15.36 MHz square wave clock signal suitable for digital circuits.

For a dual GSM/WCDMA telephone system, the 13 MHz GSM subsystem clock is used as the DDS clock signal 29, and the second, 15.36 MHz WCDMA clock signal is generated by the clock generation circuit 21 of FIG. 2. The precise frequency of the WCDMA clock signal is adjusted by simply changing the value stored in the phase step register 28. The 13 MHz GSM clock signal is generated by a fixed frequency, temperature compensated crystal oscillator.

The major parameters affecting the performance of the DDS circuit 20 are the number of bits N1 used in the phase accumulator 26, bit truncation N2 of the phase value, and the precision N3 of the sine function circuit 22. The tuning resolution of the DDS circuit 20 is 13 MHz/(2**N1). Setting N1=28 gives a tuning resolution of approximately 0.003 ppm. The performance of the DDS circuit 20 for various values of N2 and N3 has been investigated, and values of N2=8 bits and N3=6 bits appear to be sufficient.

The circuit 21 of FIG. 2 may be used in a number of circuits to adjust the WCDMA sampling clock and carrier frequencies if the GSM crystal oscillator frequency is not exactly 13 MHz.

Figure 4:
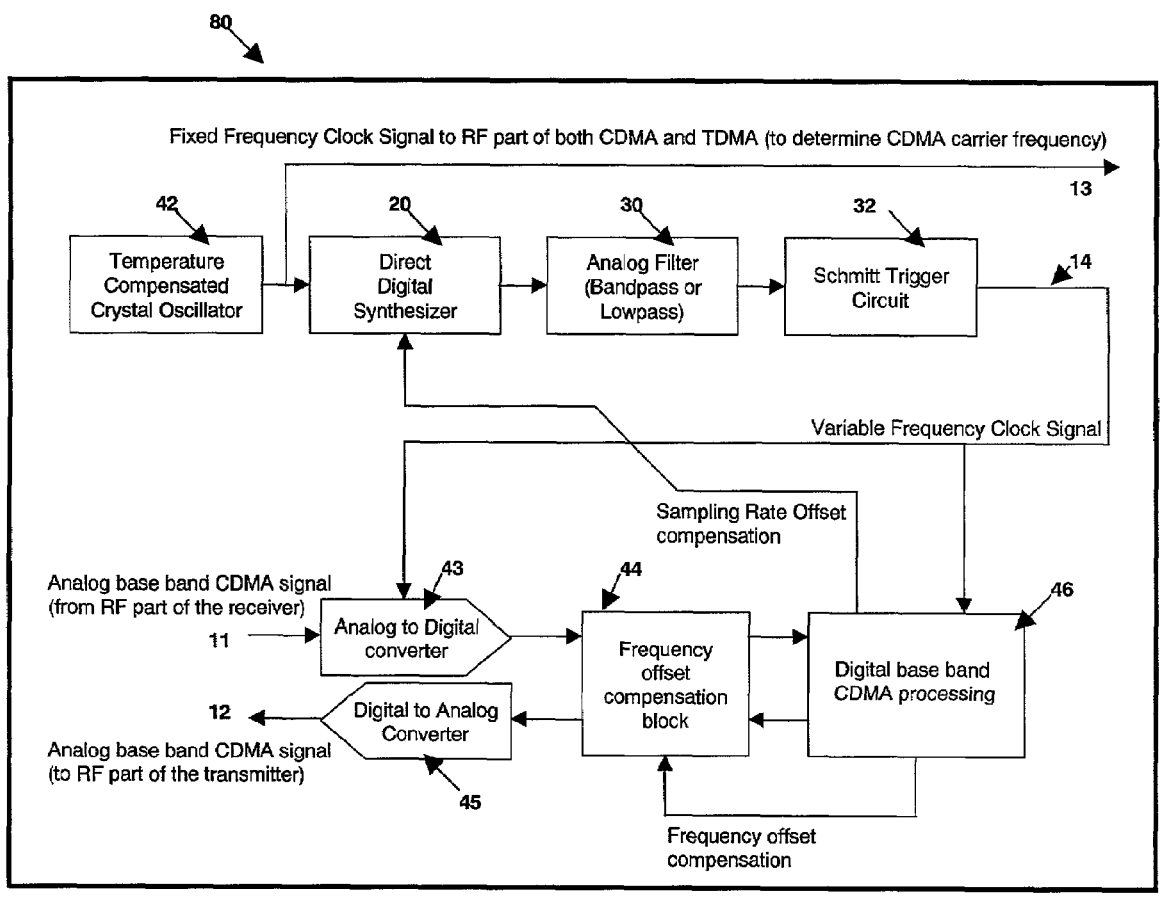
FIG. 4 is a block diagram of a first preferred embodiment of a clock generating device for generating dual clock signals and for compensation of carrier frequency and sampling rate offsets.
Figure 7:
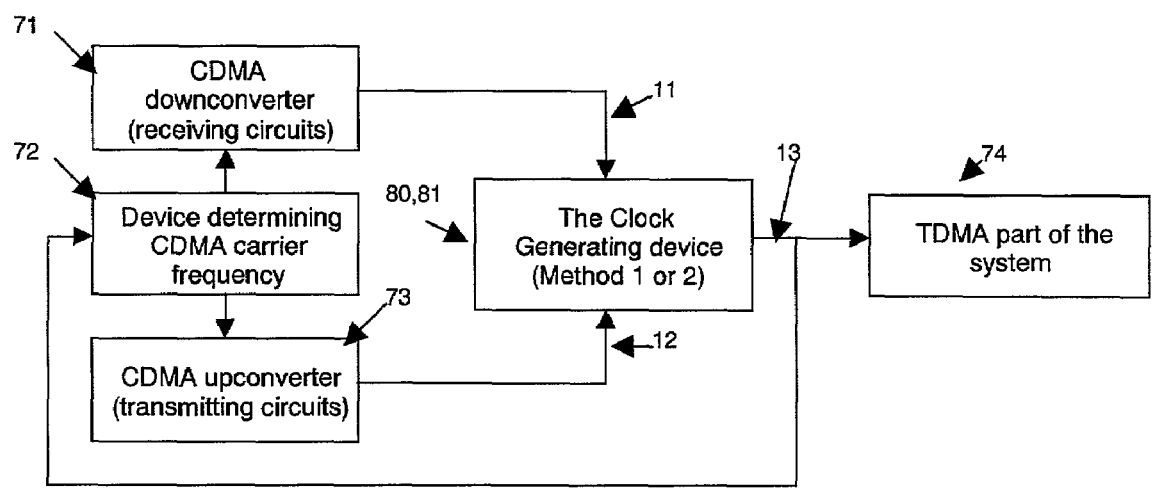
FIG. 7 is a block diagram showing a first preferred embodiment of a radio-frequency transceiver circuit.

FIG. 4 is a block diagram showing one embodiment 80 of a clock generating device that contains the mobile telephone components which use the variable clock generation circuit 20. In this device, the filtered output 14 of the DDS circuit 20 provides the sampling clock directly, which can therefore be adjusted in very fine increments. The carrier frequency is determined by an external circuit 72 using the output 13 from a fixed-frequency temperature-compensated crystal oscillator 42, as shown in FIG. 7. The analog baseband signal 11 from the RF part of the receiver 71 is digitised by an ADC 43 sampling at the rate of the variable clock signal 14. However, the deviation of the crystal oscillator 42 from its nominal frequency leads to carrier frequency offset. This offset is compensated for in the digital domain by a Frequency Offset Compensation Block 44, which simply adjusts the baseband data by applying an appropriate frequency correction. The Frequency Offset Compensation Block 44 is a digital implementation of a Single Side Band (SSB) mixer, known to those skilled in the art.

The relative frequency offset of the crystal oscillator 42 is calculated by a digital baseband CDMA processing block 46 by analysing the received signal, using any of the standard frequency offset detection algorithms known to those skilled in the art. The calculated frequency offset is multiplied by a constant and used in the frequency offset compensation value for controlling the Frequency Offset Compensation Block 44. It is also multiplied by a second constant and added to a third constant and used as the sampling rate offset compensation value by the clock generating device shown in FIG. 4 for controlling the DDS circuit 20. This sampling rate offset compensation value is used as an "AFC word" input to the phase step register 28 shown in FIG. 2.

Figure 5:
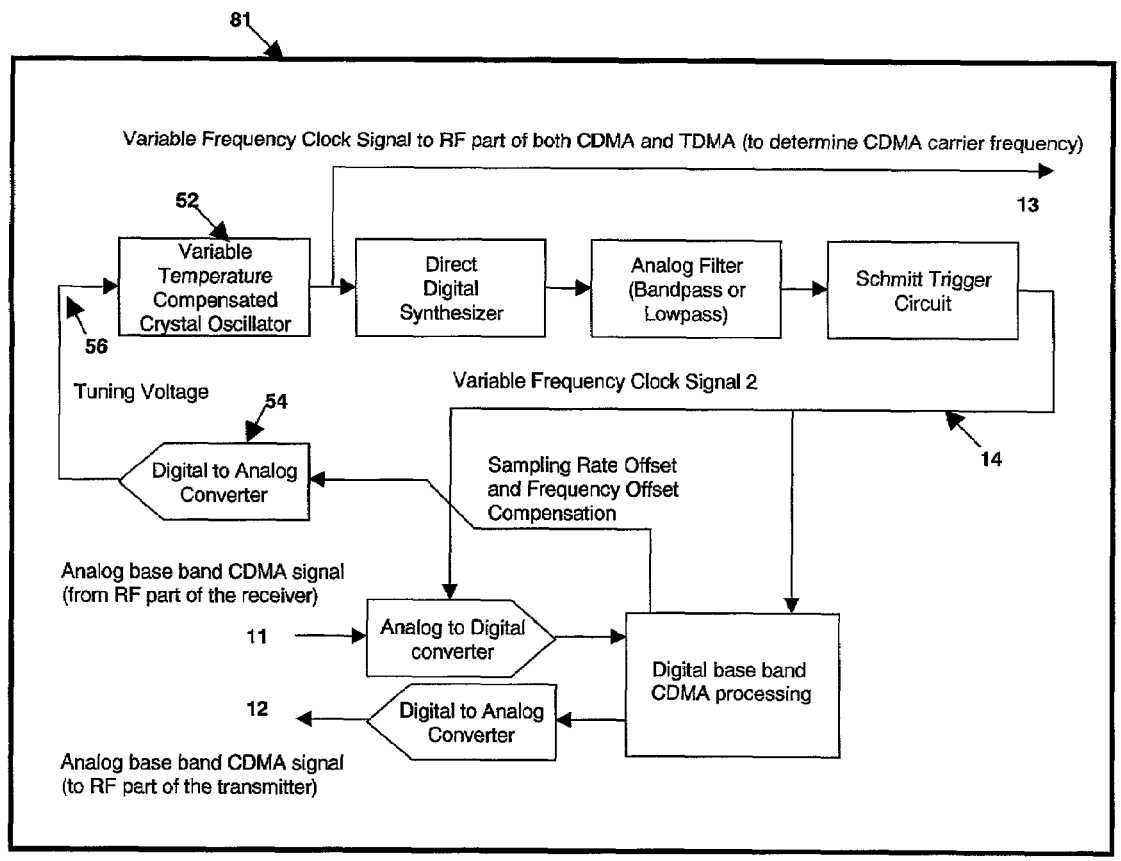
FIG. 5 is a block diagram of a second preferred embodiment of a clock generating device for generating dual clock signals and for compensation of carrier frequency and sampling rate offsets.

A second embodiment 81 of a clock generating device, as shown in FIG. 5, eliminates the need for the Frequency Offset Compensation Block 44, because the adjustment of a Variable Temperature Compensated Crystal Oscillator 52 by the CDMA processing block 46 changes both the sampling rate and the carrier frequency. The disadvantage of this circuit is the need to use an additional analog to digital converter 54 and an analog voltage line 56 to control the frequency of the crystal oscillator.

Figure 6:
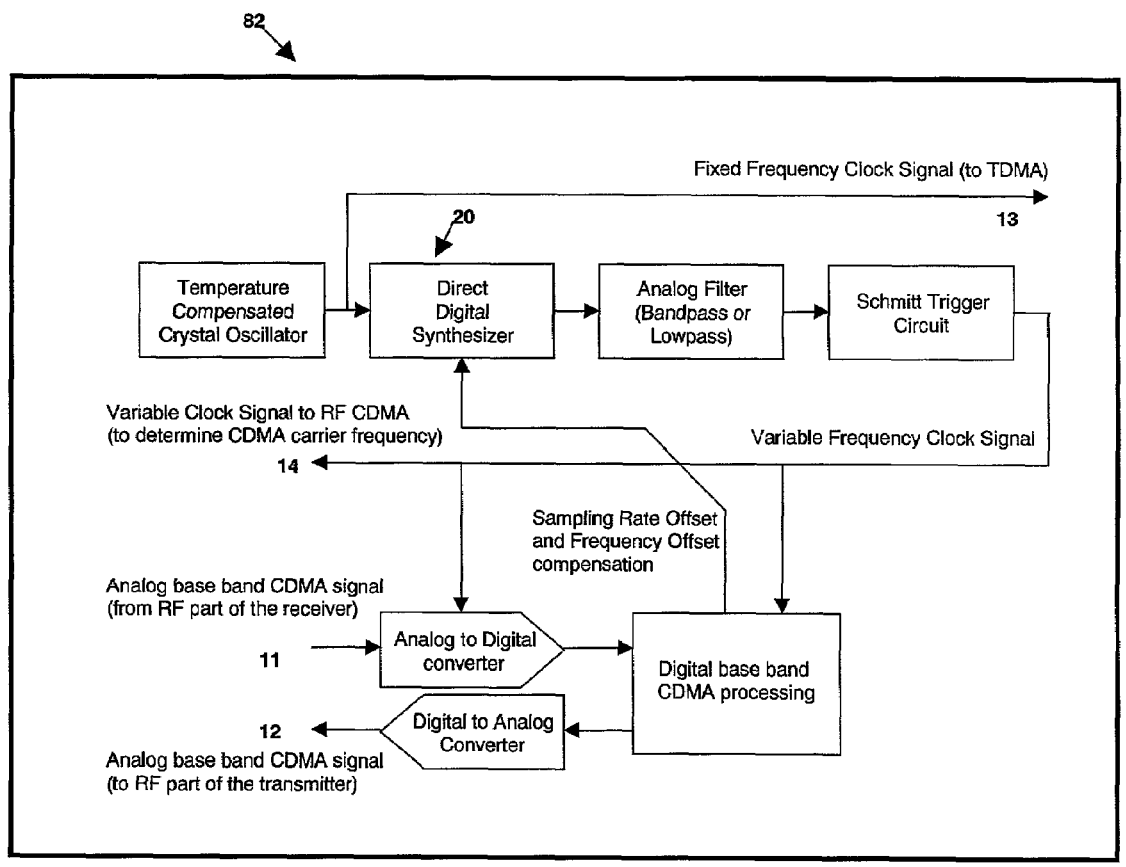
FIG. 6 is a block diagram of a third preferred embodiment of a clock generating device for generating dual clock signals and for compensation of carrier frequency and sampling rate offsets.
Figure 8:
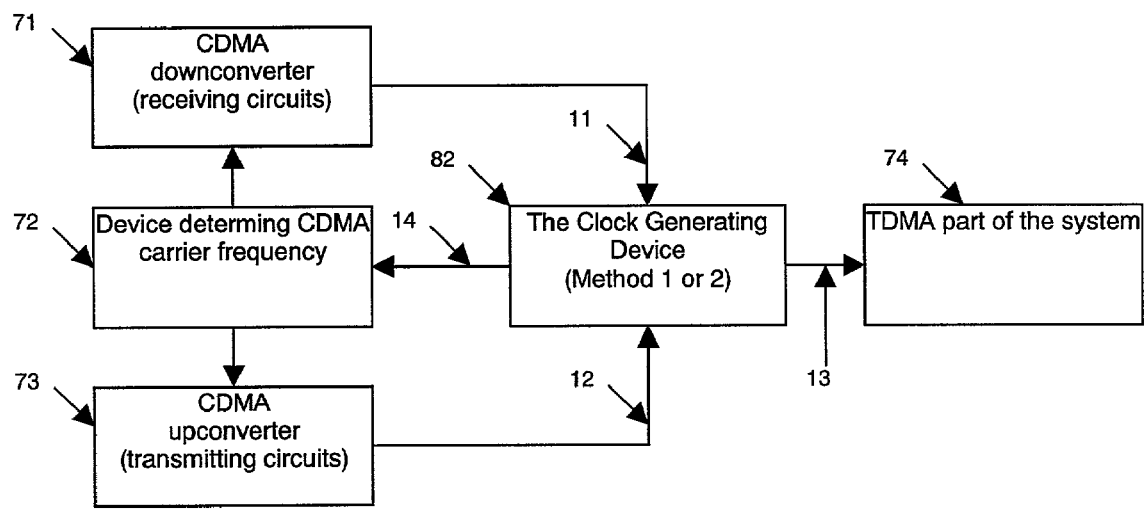
FIG. 8 is a block diagram showing a second preferred embodiment of a radio-frequency transceiver circuit.

A third embodiment 82 of a clock generating device, as shown in FIG. 6, uses the filtered output 14 from the DDS 20 as both a sampling clock and as a reference for the circuit 72 which determines the carrier frequency, as shown in FIG. 8. Therefore, adjustment of the sampling rate to the nominal value will also set the carrier frequency to the nominal value. The disadvantage of this device is that the output from the DDS has to be extremely clean in terms of phase noise and close-in spurious signals. This necessitates a more sophisticated DDS circuit 20 compared to that required for the first and second embodiments. Additionally, the design of the device 72 determining the carrier frequency becomes more complicated if the sampling rate is not an integer multiple of the carrier frequency channel raster. The channel raster is the frequency difference between adjacent radio frequency channels. The tuning step of the device determining the carrier frequency in WCDMA receivers is typically equal to the channel raster.

Each clock generation device is easily integrated into an application-specific integrated circuit (ASIC), together with other baseband processing circuitry. The only analog discrete component required by the clock circuit 21 is the filter 31 between the DDS DAC 24 and the Schmitt Trigger 32. For comparison, a PLL circuit would typically require several analog discrete components which are difficult to integrate into an ASIC. Moreover, the DDS ASIC is independent of the values of the two system carrier frequencies, subject only to the constraint that the two frequencies should be more than about 2 MHz apart. This allows a low cost band pass filter to be used.

The major performance parameters of this system are tuning resolution, spectral cleanliness and tuning speed. The main realisation factors which determine the system performance are the performance of the DDS, stop band rejection and the bandwidth of the filter following the DDS. For a WCDMA system, the required parameters are as follows:

DDS:

phase accumulator bit width>=28 bits, phase truncation=8 to 12 bits, sin(x) approximation precision=6 to 8 bits, Analog filter band pass following the DDS:

stop band rejection>60 dB, pass band response shape=approximately gaussian, center frequency=CDMA sampling rate, 3 dB bandwidth=approximately 50 to 100 kHz Many modifications will be apparent to those skilled in the art without departing from the scope of the present invention as hereinbefore described with reference to the accompanying drawings.

The claims defining the invention are as follows:

1. A clock generation circuit for a dual communications technology system radio frequency (RF) station, including:

a digital clock synthesis circuit clocked by a first clock signal for a first communications technology RF system and adapted to generate an analog base clock signal of a predetermined frequency; and means for deriving a second clock signal for a second communications technology RF system from an output of said digital clock synthesis circuit as a Nyquist image derived from said first clock signal.

2. A clock generation circuit for a dual communications technology system radio frequency (RF) station, including:

a digital clock synthesis circuit clocked by a first clock signal for a first communications technology RF system and adapted to generate an analog base clock signal of a predetermined frequency; and means for deriving a Nyquist image derived from said first clock signal, said Nyquist image having the frequency of a second clack signal for a second communications technology RF system.

3. A method for deriving a second clock signal for a second communications technology system from a first clock signal of a first communications technology system, where a frequency of said second clock signal is greater than half of a frequency of said first clock signal, including:

clocking a direct digital clock synthesis circuit with said first clock signal of a first communications technology system to generate an analog base clock signal;

applying a phase step in said synthesis circuit such that a sum of a frequency of said analog base clock signal and the frequency of said first clock signal has the frequency of said second clock signal for a second communications technology system; and deriving said second clock signal from an output of said digital clock synthesis circuit.

4. A method for deriving a second clock signal from a first clock signal according to claim 3, wherein the frequency of said second clock signal is greater than the frequency of said first clock signal.

5. A method for deriving a second clock signal from a first clock signal according to claim 3, wherein the frequencies of said clock signals are those used by different radio frequency communications systems.

6. A method for deriving a second clock signal from a first clock signal according to claim 3, wherein said phase step is such that said base clock signal frequency represents a difference in frequency between said first clock signal and said second clock signal.

* * * * *